US007471345B2

(12) United States Patent
Anai

(10) Patent No.: US 7,471,345 B2
(45) Date of Patent: Dec. 30, 2008

(54) FLAT DISPLAY DEVICE AND CONTROL METHOD THEREOF

(75) Inventor: Kimio Anai, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 637 days.

(21) Appl. No.: 11/235,293

(22) Filed: Sep. 27, 2005

(65) Prior Publication Data

US 2006/0071891 A1 Apr. 6, 2006

(30) Foreign Application Priority Data

Sep. 30, 2004 (JP) ............................ 2004-286877

(51) Int. Cl.
*H04N 5/66* (2006.01)
*H04N 5/06* (2006.01)
*H04N 3/14* (2006.01)
*G09G 3/36* (2006.01)

(52) U.S. Cl. ....................... 348/739; 348/792; 348/521; 348/547; 348/790; 345/213; 345/87; 345/98

(58) Field of Classification Search ................. 348/739, 348/790, 792, 521, 529, 500, 547; 345/204, 345/213, 90, 98, 87, 99, 100
See application file for complete search history.

(56) References Cited

U.S. PATENT DOCUMENTS

| | | | | |
|---|---|---|---|---|
| 6,115,020 | A * | 9/2000 | Taguchi et al. | 345/99 |
| 6,593,918 | B2 * | 7/2003 | Taguchi et al. | 345/204 |
| 6,667,730 | B1 * | 12/2003 | Taguchi et al. | 345/99 |
| 6,741,229 | B1 * | 5/2004 | Yanagi et al. | 345/98 |
| 6,812,915 | B2 * | 11/2004 | Yamaguchi | 345/99 |
| 6,961,034 | B2 * | 11/2005 | Kusanagi | 345/87 |

FOREIGN PATENT DOCUMENTS

| | | |
|---|---|---|
| JP | 11-119747 | 4/1999 |

* cited by examiner

*Primary Examiner*—David Ometz
*Assistant Examiner*—Jean W Désir
(74) *Attorney, Agent, or Firm*—Oblon, Spivak, McClelland, Maier & Neustadt, P.C.

(57) ABSTRACT

A flat display device includes, vertical synchronization lock means which generates an internal vertical synchronization signal, a window signal generating circuit which generates a window signal by use of the internal vertical synchronization signal, a detecting circuit which detects whether or not an external vertical synchronization signal is present in a period of the window signal, and a determination circuit which determines whether a preset condition that a plurality of detection signals are present in a preset period is satisfied or not and controls an output inhibition circuit to inhibit a gate signal from being output when the preset condition is not satisfied.

10 Claims, 3 Drawing Sheets

FLAT DISPLAY DEVICE AND CONTROL METHOD THEREOF

CROSS-REFERENCE TO RELATED APPLICATIONS

This application is based upon and claims the benefit of priority from prior Japanese Patent Application No. 2004-286877, filed Sep. 30, 2004, the entire contents of which are incorporated herein by reference.

BACKGROUND OF THE INVENTION

1. Field of the Invention

This invention relates to a flat display device such as a liquid crystal display device, plasma display device, electronic emission type display device or a display device using organic EL and a control method thereof, and more particularly to a control method for gate signals output to scanning lines.

2. Description of the Related Art

Gate signals (which are also referred to as scanning signals) are supplied from a gate drive circuit to scanning lines of a liquid crystal display device. A gate inhibition circuit which inhibits gate signals from being unnecessarily output is provided in the gate drive circuit.

When the power supply of the device is turned ON, it takes a certain time until the operation of the display device is stabilized. During this time, if a gate signal is output to the scanning line of the display area, unnecessary light emission occurs in the display area and an unstable and disturbed state occurs on the screen. In order to prevent occurrence of such a phenomenon, conventionally, the gate signal is inhibited from being output for a preset period of time at the turn-ON time of the power supply (for example, Jpn. Pat. Appln. KOKAI Publication No. H11-119747).

However, the period in which the gate signal is unnecessarily output occurs at the time other than the turn-ON time of the power supply. For example, the period occurs at the input switching time or channel switching time. In such a case, a vertical sync. signal contained in the present video signal and a vertical sync. signal contained in a newly input video signal are asynchronous from each other. As a result, the gate signal is inadvertently output, which disturbs the image in some cases.

That is, gate signal output data which is transferred to a scanning line arranged in the intermediate position in the gate drive circuit (one of a plurality of scanning lines arranged in the vertical direction which is arranged in the intermediate position) is continuously transferred after channel switching or input switching and gate signals are sequentially output to the remaining scanning lines. At this time, since an input signal from the source drive circuit is not present, disturbance of the image appears on the screen.

Further, if the unnecessary gate signal is output, electric power is uselessly consumed. Therefore, outputting of the unnecessary gate signal is not preferable from the viewpoint of reducing the power consumption.

BRIEF SUMMARY OF THE INVENTION

An object of the embodiments is to provide a flat display device capable of adequately inhibiting unwanted gate signals from being output to the scanning lines to prevent disturbance of an image on the screen and suppressing useless power consumption, and a control method thereof.

A flat display device according to an aspect of the present invention comprises a plurality of pixels arranged in a two-dimensional form in a display area, a plurality of scanning lines arranged along respective rows of groups of the pixels, a plurality of signal lines arranged along respective columns of groups of the pixels, a gate drive circuit which sequentially outputs gate signals to the plurality of scanning lines in each scanning period unit, a source drive circuit which sequentially outputs image signals to the plurality of signal lines in each scanning period unit, a plurality of pixel switch circuits each of which is configured to respond to a gate signal from a corresponding one of the scanning lines to supply an image signal from a corresponding one of the signal lines to a corresponding one of the pixels, an output inhibition circuit which is provided in the gate drive circuit to inhibit the gate signal from being output, vertical synchronization lock means which freely operates in a phase-locked fashion with an external vertical synchronization signal input from the exterior to generate an internal vertical synchronization signal, a window signal generating circuit which generates a window signal corresponding to the position of the external vertical synchronization signal by use of the internal vertical synchronization signal, a detecting circuit which outputs a detection signal when the external vertical synchronization signal is present in a period of the window signal, and a determination circuit which outputs a gate output inhibition signal used to control the output inhibition circuit when a preset condition that a plurality of detection signals are present in a preset period is not satisfied.

With the above configuration, outputting of an unnecessary gate signal can be controlled, image disturbance can be eliminated and power consumption can be reduced.

Additional objects and advantages of the embodiments will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

There will now be described an embodiment of this invention with reference to the accompanying drawings.

Figure 1:
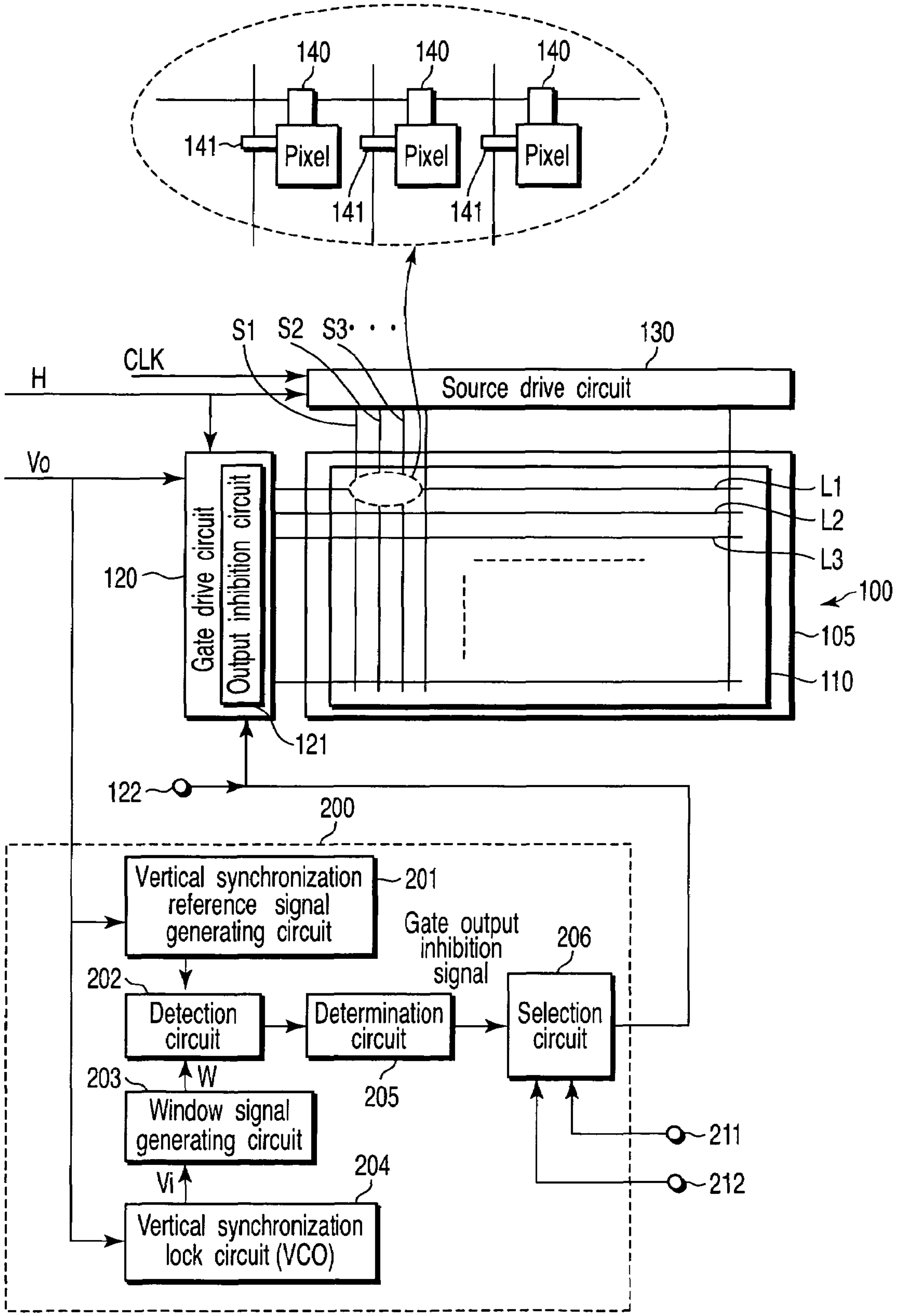
FIG. 1 is an explanatory diagram showing the configuration of a flat display device to which this invention is applied.

In FIG. 1, a reference symbol 100 denotes a liquid crystal panel and a display area 110 is formed on a glass substrate 105 of the liquid crystal panel 100. On the display area 100, pixels of red (R), green (G) and blue (B) are repeatedly arranged in a horizontal direction to form rows. A plurality of rows of pixels are provided to form a pixel group. Further, scanning lines L1, L2, L3, . . . are arranged along the respective rows of pixel groups to form a scanning line group. Likewise, signal lines S1, S2, S3, . . . are arranged along the respective columns of pixel groups to form a signal line group. Each pixel is arranged in a portion near the intersection between a corresponding one of the scanning lines of the scanning line group and a corresponding one of the signal lines of the signal line group.

A gate drive circuit 120 which sequentially selects the scanning lines of the scanning line group in each scanning period unit (for each horizontal scanning period) is provided on a circuit board (not shown). Further, a source drive circuit 130 which outputs signals to the signal line group in each scanning period unit (for each horizontal scanning period) is provided on the circuit board.

Pixel switch circuits for the respective pixels are provided near the intersections between the respective scanning lines of the scanning line group and the respective signal lines of the signal line group in the display area 110. The pixel switch circuit supplies a signal from the signal line to a corresponding pixel in response to a gate signal (selection signal) from the scanning line. As partially shown in the enlarged view, portions indicated by reference symbols 140, 141 configure the pixel switch circuits.

The gate drive circuit 120 is supplied with a horizontal synchronization signal H and vertical synchronization signal V0 as timing signals. The source drive circuit 130 is supplied with data and a clock CLK and horizontal synchronization signal H used to transfer data. On the output side of the gate drive circuit 120, an output inhibition circuit 121 is provided. The output inhibition circuit 121 functions as a circuit which inhibits a gate signal from being output for a preset period of time immediately after the power supply is turned ON, for example. A power supply turn-ON detection signal is supplied from a terminal 122.

Further, the output inhibition circuit 121 is controlled by a characteristic circuit, which is explained later, and adequately inhibits the unwanted gate signal from being output to the scanning line to prevent disturbance of the screen and suppress useless power consumption. For this purpose, a gate output inhibition signal is supplied from an inhibition signal generating circuit 200 to the output inhibition circuit 121.

The inhibition signal generating circuit 200 monitors whether or not the vertical synchronization signal V0 continuously lies in the precise phase. If synchronization of the vertical synchronization signal V0 is disturbed, it determines that it is the channel switching time or external input switching time. Then, it inhibits outputting of the gate signal until it is confirmed that the input vertical synchronization signal V0 is continuously stable and lies in a preset phase. In order to inhibit outputting of the gate signal, the gate output inhibition signal is output.

The monitoring method is carried out by use of the following means. The vertical synchronization signal V0 is input to a vertical synchronization reference signal generating circuit 201 and vertical synchronization lock circuit 204. The vertical synchronization reference signal generating circuit 201 shapes the waveform of the input vertical synchronization signal V0 and outputs the thus waveform-shaped signal. The vertical synchronization signal V0 is input to a detecting circuit 202.

The vertical synchronization lock circuit 204 has a hysteresis characteristic and generates a pulse which is phase-locked with the vertical synchronization signal V0. The pulse has a frequency which is several times or several tens of times the frequency of the vertical synchronization signal V0. As the vertical synchronization lock circuit 204, a digital phase lock loop circuit is used to freely oscillate and output the above pulse. By dividing the frequency of the pulse, an internal vertical synchronization signal Vi which is phase-locked with the vertical synchronization signal V0 can be generated. The internal vertical synchronization signal Vi is supplied to a window signal generating circuit 203.

The window signal generating circuit 203 has a counter which is reset by the internal vertical synchronization signal Vi and generates a window signal W which covers the internal vertical synchronization signal Vi (vertical synchronization signal V0). The window signal W is input to the detecting circuit 202.

The detecting circuit 202 outputs a detection signal and supplies the same to the determination circuit 205 when the vertical synchronization signal V0 lies in the window signal W. When a preset number of detection signals are received in a preset period of time or a preset number of detection signals are continuously received, the determination circuit 205 determines that the vertical synchronization signal V0 is correctly and continuously generated. However, when a preset number of detection signals are not received in a preset period of time or a discontinuous state continues for a preset period of time, the determination circuit 205 outputs a gate output inhibition signal to control the output inhibition circuit 121 of the gate drive circuit 120.

As a result, it becomes possible to prevent an unnecessary gate signal from being output when the vertical synchronization signal contained in the present video signal and the vertical synchronization signal contained in a newly input video signal become asynchronous from each other at the input switching time, channel switching time, or the like. Thus, image disturbance does not occur. Further, the time in which an unnecessary gate signal is output to wastefully consume electric power can be omitted.

The selection circuit 206 includes an operation signal input terminal 211 and gate output inhibition signal input terminal 212. The selection circuit 206 can select one of an output signal of the determination circuit 205 and a signal of the input terminal 212 by switching the level of a signal of the operation signal input terminal 211.

Therefore, for example, if the user wants to forcedly supply a gate output inhibition signal to the output inhibition circuit 121, the gate inhibition signal can be forcedly output by switching the level of the operation signal of the operation signal input terminal 211 (for example, by setting the signal to a high level). Further, in a case where the image is made forcedly non-visible, the input terminal 211 can be used. In order to permit the output of the determination circuit 205 to be supplied to the output inhibition circuit 121, the selection circuit 206 is set into the conductive state (at this time, the operation signal is set at a low level, for example).

Figure 2:
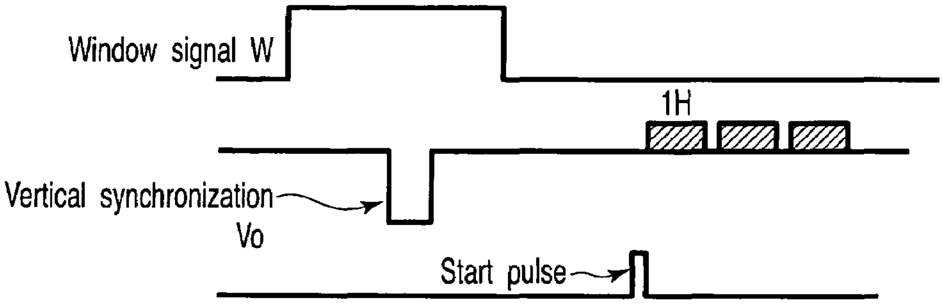
FIG. 2 is a signal waveform diagram for illustrating the operation of an inhibition signal generating circuit 200 of FIG. 1.

FIG. 2 shows the relation between the window signal W and the vertical synchronization signal V0. The gate drive circuit 120 normally generates a start pulse in synchronism with the vertical synchronization signal V0 to start the scanning operation by use of the gate signal. After the start pulse is generated, a signal of one horizontal scanning period is output from the source drive circuit 130 to the signal line for each horizontal scanning period.

Figure 3:
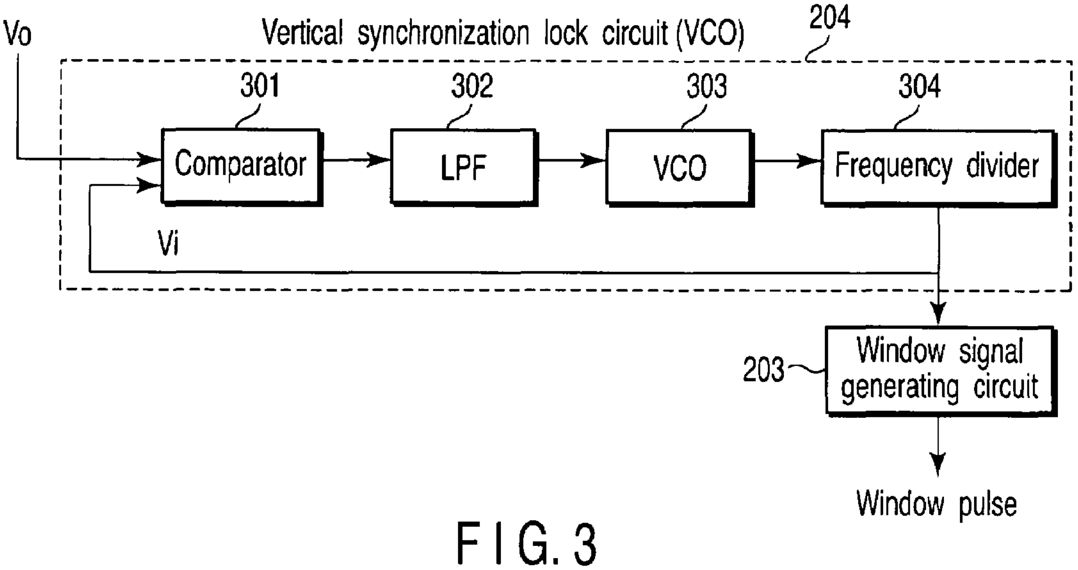
FIG. 3 is a diagram showing an example of the configuration of a vertical synchronization lock circuit 204 of FIG. 1.

FIG. 3 shows an example of the configuration of the vertical synchronization lock circuit 204. The phases of the vertical synchronization signal V0 and an internal vertical synchronization signal Vi generated in the internal portion are compared in a comparator 301. Phase-difference information is output from the comparator 301. The phase-difference information is smoothed by a low-pass filer (LPF) 302 and a D.C. variation component is output from the low-pass filter (LPF) 302. The D.C. variation component is supplied to the control terminal of a voltage-controlled oscillator (VCO) 303. The oscillation frequency of the voltage-controlled oscillator (VCO) 303 is changed according to the voltage applied to the control terminal thereof. An output signal of the voltage-controlled oscillator (VCO) 303 is frequency-divided by a frequency divider 304 and the frequency divider 304 outputs a vertical synchronization pulse, that is, the internal vertical synchronization signal Vi. Therefore, if the phase of the external vertical synchronization pulse V0 is shifted, the phase of the internal vertical synchronization signal Vi is controlled in accordance with the shifted phase.

The internal vertical synchronization signal Vi is input to the window signal generating circuit 203. The window signal generating circuit 203 causes the counter to be operated in synchronism with the internal vertical synchronization signal Vi and outputs the window signal W by use of the counter output.

Figure 4A:
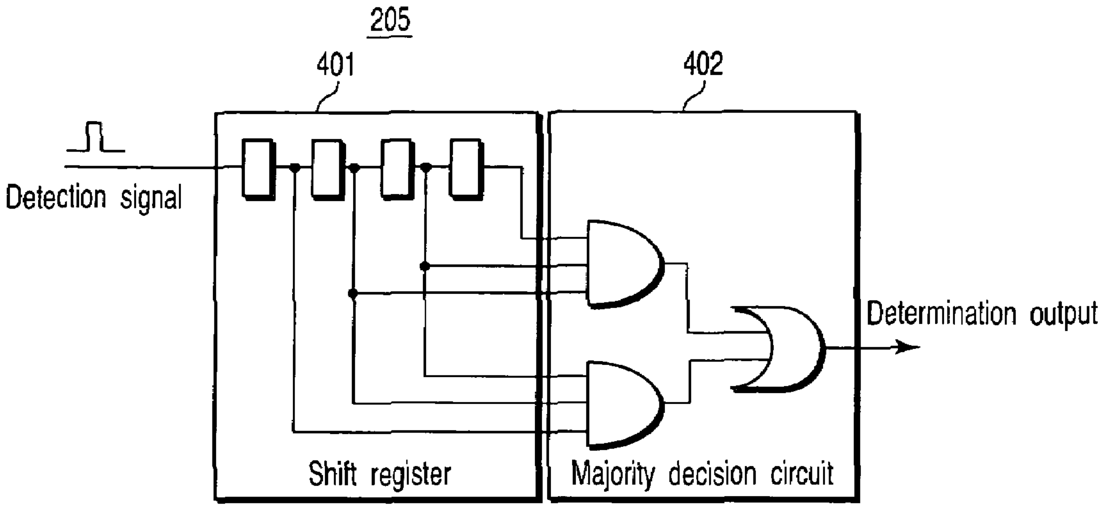
FIGS. 4A to 4C are examples of the configurations of various embodiments of a determination circuit 205 of FIG. 1.

FIG. 4A shows an example of the determination circuit 205. The determination circuit 205 includes a shift register 401 and majority decision circuit 402. The shift register 401 shifts a detection pulse output from the detecting circuit 202 at the timing of the internal vertical synchronization signal. The majority decision circuit 402 connected to the shift register 401 monitors the output states of a plurality of delay elements configuring the shift register. Then, if outputs of three delay elements among the four delay elements are set at the logic "1", for example, the majority decision circuit 402 generates a determination output indicating that the vertical synchronization signal lies in the window signal W based on majority decision.

Figure 4B:
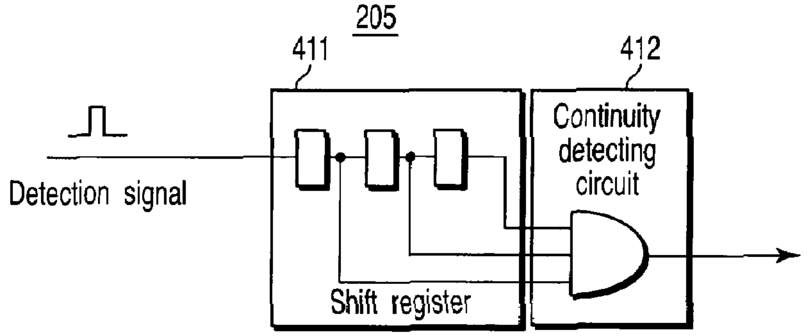

A circuit of FIG. 4B is an example of the determination circuit 205 configured by a shift register 411 and continuity detecting circuit 412. The continuity detecting circuit 412 monitors output states of a plurality of delay elements configuring the shift register. The continuity detecting circuit 412 generates a determination output indicating that the vertical synchronization signal lies in the window signal W if at least three consecutive outputs among the outputs of the delay elements are set at the logic "1", for example.

Figure 4C:
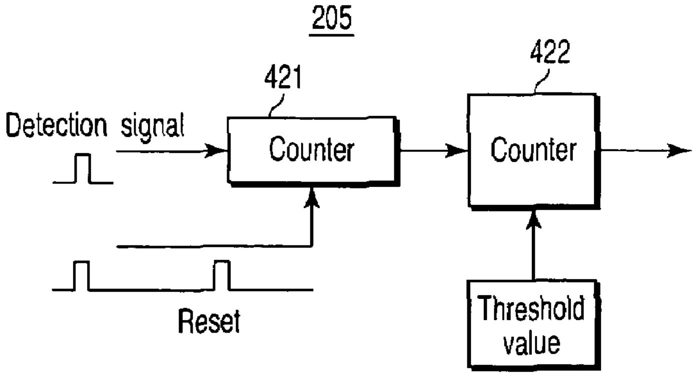

In a circuit of FIG. 4C, a detection signal is counted by use of a counter 421. The counter 421 is reset for every several vertical scanning periods (for example, every ten vertical scanning periods). A count of the counter 421 is compared with a threshold value 423 in a comparator 422. If the count exceeds the threshold value 423, a determination output indicating that the vertical synchronization signal lies in the window signal W is obtained. As the configuration of the determination circuit, various embodiments can be made.

This invention is not limited to the above embodiment and can be embodied by modifying the constituents without departing from the technical scope thereof at the embodying stage. Further, various inventions can be made by adequately combining a plurality of constituents disclosed in the above embodiment. For example, several constituents can be omitted from the whole constituents disclosed in the above embodiment. Further, constituents disclosed in different embodiments can be adequately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A flat display device comprising:

a plurality of pixels arranged in a two-dimensional form in a display area, a plurality of scanning lines arranged along respective rows of groups of the pixels, a plurality of signal lines arranged along respective columns of groups of the pixels, a gate drive circuit which sequentially outputs gate signals to the plurality of scanning lines in each scanning period unit, a source drive circuit which outputs image signals to the plurality of signal lines in each scanning period unit, a plurality of pixel switch circuits each of which is configured to respond to a gate signal from a corresponding one of the scanning lines to supply an image signal from a corresponding one the signal lines to a corresponding one of the pixels, an output inhibition circuit which is provided in the gate drive circuit to inhibit the gate signal from being output, vertical synchronization lock means which freely operates in a phase-locked fashion with an external vertical synchronization signal input from an exterior to generate an internal vertical synchronization signal, a window signal generating circuit which generates a window signal corresponding to the position of the external vertical synchronization signal by use of the internal vertical synchronization signal, a detecting circuit which outputs a detection signal when the external vertical synchronization signal is present in a period of the window signal, and a determination circuit which outputs a gate output inhibition signal used to control the output inhibition circuit when a preset condition that a plurality of detection signals are present in a preset period is not satisfied.

2. The flat display device according to claim 1, further comprising a selection circuit provided between the determination circuit and the output inhibition circuit, wherein a gate signal output inhibition signal is forcedly supplied to the output inhibition circuit via the selection circuit.

3. The flat display device according to claim 1, wherein the determination circuit includes a shift register which shifts the detection signal in a vertical period, and a majority decision circuit which makes a majority decision to determine whether outputs of respective stages of the shift register indicate detection signals of not less than a preset number and output the gate signal output inhibition signal when the preset number of detection signals is not exceeded.

4. The flat display device according to claim 1, wherein the determination circuit includes a shift register which shifts the detection signal in a vertical period, and a continuity detection circuit which determines whether detection signals are continuous by use of outputs of respective stages of the shift register and outputs the gate signal output inhibition signal when the detection signals are not continuous.

5. The flat display device according to claim 1, wherein the determination circuit includes a counter which counts the detection signals in a vertical period, and a comparator which determines whether a count value of the counter exceeds a threshold value in a preset period of time and outputs the gate signal output inhibition signal when the count value does not exceed the threshold value.

6. A control method for a flat display device which includes a plurality of pixels arranged in a two-dimensional form in a display area, a plurality of scanning lines arranged along respective rows of groups of the pixels, a plurality of signal lines arranged along respective columns of groups of the pixels, a gate drive circuit which sequentially outputs gate signals to the plurality of scanning lines in each scanning period unit, a source drive circuit which outputs image signals to the plurality of signal lines in each scanning period unit, a plurality of pixel switch circuits each of which is configured to respond to a gate signal from a corresponding one of the scanning lines to supply an image signal from a corresponding one the signal lines to a corresponding one of the pixels, and an output inhibition circuit which is provided in the gate drive circuit to inhibit the gate signal from being output, comprising:

causing an internal vertical synchronization signal to be freely generated in a phase-locked fashion with an external vertical synchronization signal input from an exterior, generating a window signal corresponding to the position of the external vertical synchronization signal by use of the internal vertical synchronization signal, generating a detection signal when the external vertical synchronization signal is present in a period of the window signal, and generating a gate output inhibition signal used to control the output inhibition circuit when a preset condition that a plurality of detection signals are present in a preset period is not satisfied.

7. The control method for the flat display device according to claim 6, wherein a gate signal output inhibition signal is forcedly supplied to the output inhibition circuit.

8. The control method for the flat display device according to claim 6, wherein generating the gate output inhibition signal comprises shifting the detection signal in a vertical period by use of a shift register, making a majority decision to determine whether outputs of respective stages of the shift register indicate detection signals of not less than a preset number, and outputting the gate signal output inhibition signal when the preset number of detection signals is not exceeded.

9. The control method for the flat display device according to claim 6, wherein generating the gate output inhibition signal comprises shifting the detection signal in a vertical period by use of a shift register, determining whether outputs of respective stages of the shift register indicate a preset number of continuous detection signals, and outputting the gate signal output inhibition signal when the detection signals of the preset number are not continuous.

10. The control method for the flat display device according to claim 6, wherein generating the gate output inhibition signal comprises counting the detection signals in a vertical period by use of a counter, determining whether a count value of the counter exceeds a threshold value in a preset period of time, and outputting the gate signal output inhibition signal when the count value does not exceed the threshold value.

* * * * *